(12) United States Patent
Popov

(10) Patent No.: US 6,277,247 B1
(45) Date of Patent: Aug. 21, 2001

(54) OPERATION METHOD OF A PLANT FOR DISTILLING LIQUID PRODUCTS AND PLANT FOR REALIZING THE SAME

(75) Inventor: Serguei A. Popov, 11707 S. Sam Houston Pkwy. West, Suite R, Houston, TX (US) 77031

(73) Assignees: Evgueni D. Petroukhine, Limassol (CY); Serguei A. Popov, Budapest (HU)

( * ) Notice: Subject to any disclaimer, the term of this patent is extended or adjusted under 35 U.S.C. 154(b) by 0 days.

(21) Appl. No.: 09/202,774

(22) PCT Filed: Jun. 5, 1998

(86) PCT No.: PCT/RU98/00137

§ 371 Date: Dec. 21, 1998

§ 102(e) Date: Dec. 21, 1998

(87) PCT Pub. No.: WO98/50127

PCT Pub. Date: Nov. 12, 1998

(30) Foreign Application Priority Data

May 6, 1997 (RU) .................................... 97107409

(51) Int. Cl.$^7$ ................................. B01D 3/10; C10G 7/06
(52) U.S. Cl. .......................... 203/91; 196/114; 196/132; 202/160; 202/182; 202/205; 203/1; 203/2; 203/DIG. 14; 208/184; 208/357; 208/366
(58) Field of Search .......................... 196/98, 132, 114, 196/115, 122, 138, 140; 208/350, 369, 366, 357, 184; 417/77, 151; 202/205, 160, 197, 202, 182; 203/91, 99, DIG. 14, DIG. 19, 1, 2; 159/DIG. 16, 44, DIG. 40

(56) References Cited

U.S. PATENT DOCUMENTS

| | | | |
|---|---|---|---|
| 1,567,429 | * 12/1925 | Earl et al. | 208/361 |
| 2,105,935 | * 1/1938 | Swanson | 196/73 |
| 2,680,709 | 6/1954 | Skinner. | |
| 3,505,176 | * 4/1970 | Buchsbaum | 203/73 |
| 3,579,307 | * 5/1971 | Wakita et al. | 422/131 |
| 5,935,388 | * 8/1999 | Meszaros | 203/DIG. 8 |

FOREIGN PATENT DOCUMENTS

| | | |
|---|---|---|
| 63-296801 | * 12/1988 | (JP). |
| 2048156 | 11/1995 | (RU). |
| 2050168 | 12/1995 | (RU). |
| 1081197 | 3/1984 | (SU). |
| WO 96/16711 | 6/1996 | (WO). |

\* cited by examiner

*Primary Examiner*—Virginia Manoharan
(74) *Attorney, Agent, or Firm*—Mark A. Oathout

(57) ABSTRACT

The invention pertains to the field of the petrochemical industry. The invention essentially relates to a system and method that includes feeding of a liquid having molecular weight more than 100 (in atomic mass units) into a nozzle of an ejector as a motive liquid, and delivery of a mixed medium from the ejector into a shaped reservoir, where flow velocity is reduced and static pressure is boosted. The outlet of the ejector is connected to the inlet of the shaped reservoir, the inlet of a separator is connected to the outlet of the shaped reservoir. The introduced method and the system for its embodiment ensure a more efficient operation.

4 Claims, 1 Drawing Sheet

OPERATION METHOD OF A PLANT FOR DISTILLING LIQUID PRODUCTS AND PLANT FOR REALIZING THE SAME

BACKGROUND

The invention pertains to the field of the petrochemical industry, mainly to methods and systems for fractionation of oil derivatives in vacuum rectification columns.

An operational process of a system for distilling liquid products is known, which includes feeding of a stock product into a vacuum rectification column, fractionation of the stock product in the said column into a vapor phase and a liquid fraction and evacuation of the vapor phase by a steam jet apparatus (see U.S. Pat. No. 2,680,709, cl. 202–204, 1954).

The same U.S. patent introduces a system for distilling liquid products, which has a vacuum rectification column with pipelines for bleeding of the vapor phase and liquid fraction, and a steam jet apparatus.

This system implementing the above described operational process provides the vacuum distillation of liquid products, oil derivatives, as a rule. However, during operation the system produces a mixture of oil derivatives and water, which is formed during evacuation of the vapor phase from the column. Discharge of the mixture into drainage results in environmental pollution whereas purification of such waste water is very expensive.

The starting point for the method of operation of a system for liquid product distillation, which includes in feeding of a stock product into a vacuum rectification column, fractionation of the stock product in the said column into a gas-vapor phase and at least one liquid fraction, evacuation of the gas-vapor phase by a liquid-gas ejector, has been disclosed in RU patent 2048156, cl. B 01 D 3/10, 1995. According to this patent a motive liquid is delivered from a separator into a nozzle of the ejector. Flowing from the nozzle, the liquid entrains the gas-vapor phase. Then the motive liquid mixes with the gas-vapor phase and compression of the gas-vapor component of the mixture takes place.

The same RU patent describes a system for liquid product distillation, having a vacuum rectification column with pipelines for bleeding of gas-vapor phase and at least one liquid fraction, and a vacuum-producing device composed of a liquid-gas ejector, a separator and a pump.

SUMMARY OF THE INVENTION

This system implements the introduced method and provides for evacuation of the gas-vapor phase from the rectification column by the liquid-gas ejector. A liquid, which is cognate to the evacuated gas-vapor phase by its physical and chemical properties, is used as the motive medium. Such system reduces environmental discharge of harmful substances.

However, if the molecular weight of the motive liquid is more than 100 (in atomic mass units), it is impossible to achieve conditions, where mixing of the motive liquid and gas-vapor phase is completed in the ejector's flow-through canal. I.e. in this case phase equilibrium between the mixing components can not be attained in the ejector. The phase equilibrium occurs if a saturated solution of gaseous components of the gas-vapor phase in the motive liquid is obtained while mixing of the motive liquid and gas-vapor phase. Consequently, specific pressure and temperature in the flow-through canal of the ejector and also a certain period of time are required for attainment of the phase equilibrium. All required conditions can not be maintained in the ejector's flow-through canal without a reduction of the ejector's efficiency. An incomplete mixing process results in an extra power input for pumping of the gas-vapor-liquid mixture from the ejector to the separator and in an incremental loading of the separator, where completion of the mixing process takes place in addition to the main function—separation of the gas-liquid mixture into the motive liquid and compressed gas.

Besides, from ecological and economical points of view, the completeness of the condensation of easy-condensable components of the gas-vapor phase has great importance for reduction of harmful products' pollution on the one hand, and for recovery of valuable chemical product on the other hand. After separation the easy-condensable components can be bled from the system as a desired product of the rectification column. But in order to achieve an optimal mode of the separator's operation, condensation of the easy-condensable components must be completed before entry of the medium's mixture into the separator.

The present invention is aimed at increasing of efficiency, productivity and environmental safety of the process of fractionation of petroleum products.

The above mentioned objectives are achieved because the operational method of a system for the distillation of a liquid product, including delivery of a stock product into a vacuum rectification column, fractionation of the stock product in the column into a gas-vapor phase and at least one liquid fraction, evacuation of the gas-vapor phase by a liquid-gas ejector, delivery of a motive liquid from a separator into the nozzle of the ejector, entrainment of the gas-vapor phase by the motive liquid while it's flowing from the nozzle, mixing of the motive liquid with the gas-vapor phase and compression of the gas-vapor component of the formed mixture, is modified as follows:

a liquid having a molecular weight more than 100 (in atomic mass units) is delivered into the nozzle of the ejector as the motive liquid;

the mixture of the gas-vapor phase and the motive liquid is discharged from the ejector into a shaped reservoir, where flow velocity is reduced, static pressure is boosted and, therefore, conditions for condensation of easy-condensable components of the mixture, for attainment of phase equilibrium and for transformation of the gas-vapor-liquid mixture into a gas-liquid mixture are created;

the gas-liquid mixture is delivered from the shaped reservoir into the separator, where it is separated into the motive liquid and compressed gas.

As for the system as an object of the invention, the problem is solved by providing a system for the distillation of a liquid product, which has a vacuum rectification column with pipelines for bleeding of a gas-vapor phase and at least one liquid fraction, and a vacuum-producing device composed of a liquid-gas ejector, a separator and a pump, with a shaped reservoir. A gas inlet of the ejector is connected to the pipeline for bleeding of the gas-vapor phase, a liquid inlet of the ejector is connected to the discharge side of the pump, an outlet of the ejector is connected to the inlet of the shaped reservoir, an inlet of the separator is connected to the outlet of the shaped reservoir and a liquid outlet of the separator is connected to the suction side of the pump.

Research efforts have shown, that rational usage of all of the system's components, namely usage of each device exactly for its designated purpose, has great importance for operational stability of the system for the distillation of a liquid product.

In case a liquid with molecular weight more than 100 (in atomic mass units) is used as the motive liquid, the mixing process does not have enough time to be completed and phase equilibrium is not achieved in the liquid-gas ejector. Consequently, a gas-vapor-liquid stream with a high content of the gas-vapor phase enters a flowing channel following the ejector. This results in big hydraulic losses and requires a pipeline of greater diameter between the ejector and separator. Consequently, the system's mass rises. Additionally, both the mixture's separation into a compressed gas and a motive liquid, and the forming of a saturated solution of gas in the motive liquid being accompanied by condensation of easy-condensable components of the mixture take place in the separator. The simultaneous progression of these two processes, requiring different suitable conditions for their complete realization, results in that a phase equilibrium is not achieved and in the reduction of yield of light fraction from the system. Installing the shaped reservoir between the ejector's outlet and the separator's inlet slows the mixture's flow down and boosts static pressure in the mixture. As a result, the processes of dissolution of the gaseous component of the mixture and condensation of its vapor component, which, as a rule, consists of easy-condensable ingredients of the liquid fraction, are intensified.

The shaped reservoir can, for example, have a smoothly diverging inlet section and smoothly converging outlet section, can have one or more contractions of its mid section or can have the inlet section diverging stepwise and the outlet section converging stepwise. The selection of form of the shaped reservoir is determined by the physical and chemical properties of the evacuated gas-vapor phase. Nevertheless the most preferable design of the shaped reservoir is the one with the inlet section diverging stepwise and with a smoothly converging outlet section. Such profile of the shaped reservoir causes the mixture's flow into the inlet section to be turbulent due to the sharp enlargement of the flow area and, therefore, intensifies mixing of the medium, which is accompanied by intensive condensation of easy-condensable components and the dissolution of the gaseous components in the motive liquid. Thus, phase equilibrium is achieved and the transformation of the mixture's stream into a gas-liquid stream is completed in the reservoir. Completion of these processes in the shaped reservoir results in a reduction of the mixture's volume and in a decrease of the content of the gaseous component in the mixture, which allows one to increase the yield of the liquid fraction from the system and to reduce the hydraulic resistance in the pipeline following the ejector. At the same time, the smoothly converging design of the outlet section of the shaped reservoir provides for gradual acceleration of the gas-liquid flow with minimal hydraulic losses. If it is necessary or desirable to make the mixing process more intensive, the reservoir should have one or more contractions of its mid section, which ensures cyclical changing of the velocity and the static pressure of the flow.

The selection of a suitable motive liquid for the system has great importance from an ecological point of view. A liquid, having physical and chemical properties which are similar to the properties of the easy-condensable component of the evacuated gas-vapor phase (properties of the latter, are in turn, similar to the properties of an upper side-cut distillate from the rectification column), can be selected as the motive liquid. The operational method which is introduced allows the usage of a liquid fraction of the rectification column having a molecular weight more than 100 (in atomic mass units) as the motive liquid. The Employment of such a motive liquid ensures the completion of the mixing of the medium and the attainment of a phase equilibrium in the gas-liquid mixture before entry of the mixture into the separator. Such, in turn, increases the yield of the liquid fraction from the rectification column during the distillation process.

So the efficiency and environmental safety of the system for the distillation of a liquid product are improved, and the technical problem which has been stated is solved.

DETAILED DESCRIPTION

Figure 1:
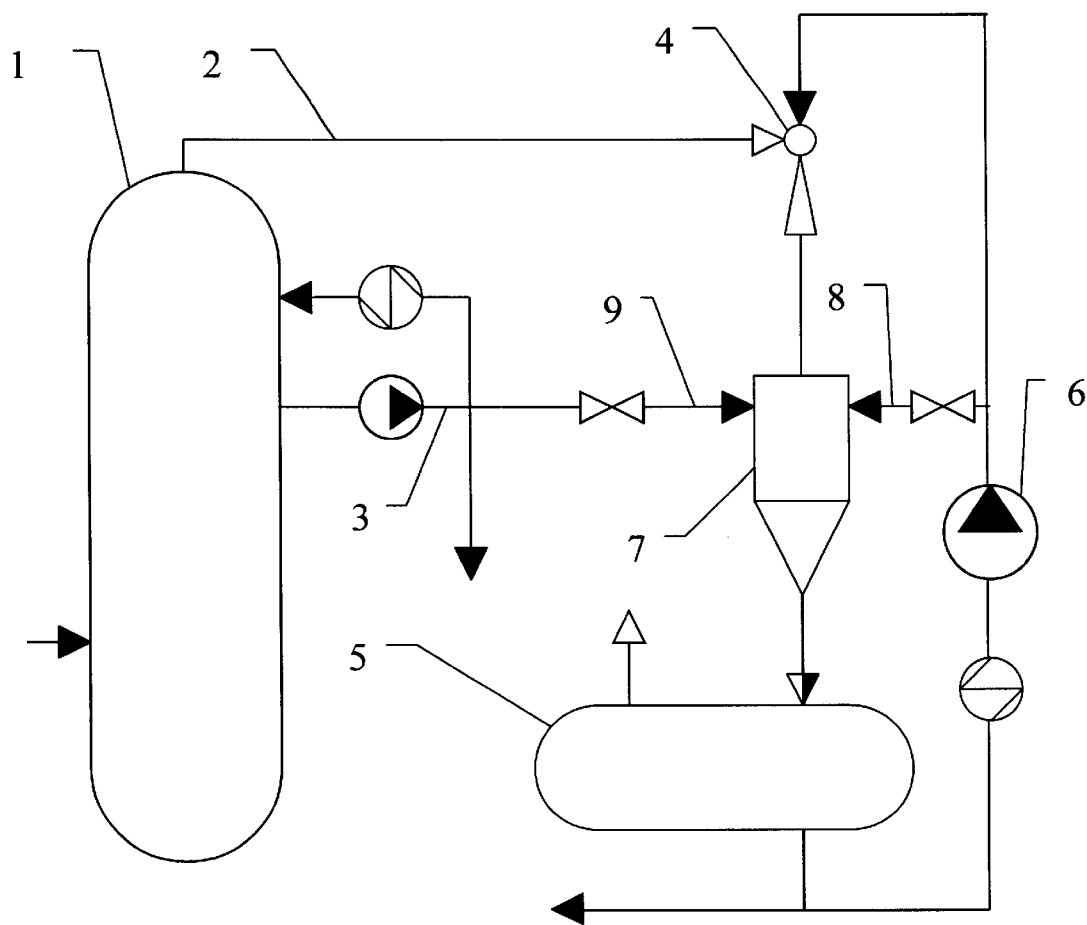
FIG. 1 represents a schematic diagram of a system for the distillation of a liquid product, which implements the introduced method of operation.

The system for the distillation of a liquid product has a vacuum rectification column 1 with pipelines 2 and 3 for bleeding of the gas-vapor phase and at least one liquid fraction, and a vacuum-producing device composed of a liquid-gas ejector 4, a separator 5 and a pump 6. The system is furnished with a shaped reservoir 7. A gas inlet of the liquid-gas ejector 4 is connected to the pipeline 2 for bleeding of gas-vapor phase, a liquid inlet of the ejector 4 is connected to the discharge side of the pump 6, an outlet of the ejector 4 is connected to an inlet of the shaped reservoir 7, an inlet of the separator 5 is connected to an outlet of the shaped reservoir 7 and a liquid outlet of the separator 5 is connected to the suction side of the pump 6.

The shaped reservoir 7 can be connected to the discharge side of the pump 6 via line 8 and can be connected to the pipeline 3 for bleeding of at least one liquid fraction via line 9.

The system realizes the operational method which is introduced, as follows:

A stock product is fed into the vacuum rectification column 1, where the product is cut into a vapour phase and at least one liquid fraction. The liquid fraction is bled through the pipeline 3 as a desired product of the column 1 and the gas-vapor phase is evacuated by the liquid-gas ejector 4. The pump 6 delivers a motive liquid from the separator 5 into the nozzle of the liquid-gas ejector 4. The motive liquid outflowing from the ejector's nozzle entrains the gas-vapor phase of the column 1 into the ejector 4. The motive liquid and the gas-vapor phase are mixed in the ejector 4 forming a gas-vapor-liquid mixture having compression of the gas-vapor component of the mixture. The gas-vapor-liquid mixture proceeds from the ejector 4 into the shaped reservoir 7, where easy-condensable components of the mixture are condensed in the motive liquid and the gaseous component of the mixture is dissolved in the motive liquid up to saturation. Thus a gas-liquid mixture is formed in the shaped reservoir 7 and then flows into the separator 5. The gas-liquid mixture is separated in the separator into a compressed gas and the motive liquid, while the motive liquid is partly degassed during the mixture's separation. Any surplus of the motive liquid generated as a result of condensation of easy-condensable components of the gas-vapor-liquid mixture, is bled from the separator 5 as a base product of the system for the distillation of a liquid product. The compressed gas is also discharged from the separator 5 as a product of the system, for example as a hydrocarbon fuel (if oil derivatives are distilled) for a boiler installation.

In case it is necessary to intensify condensation of easy-condensable components of the mixture, the liquid fraction from the pipeline 3 or the motive liquid from the discharge side of the pump 6 can be delivered additionally into the shaped reservoir 7 via lines 9 and 8, respectively.

INDUSTRIAL APPLICABILITY

The invention can be used in petrochemical, chemical as well as some other industries.

What is claimed is:

1. In an operational method for a system for distillation of a liquid product, including feeding a stock product into a rectification column, fractionating the stock product into a gas-vapor phase and at least one liquid fraction, evacuating the gas-vapor phase by a liquid-gas ejector, delivering a motive liquid from a separator into a nozzle of the ejector, entraining the gas-vapor phase by the motive liquid flowing out of the nozzle, subsequently mixing the motive liquid with the gas-vapor phase to form a gas-vapor-liquid mixture and compressing a gas-vapor component of the gas-vapor-liquid mixture, the improvement comprising the steps of:

delivering a liquid having a molecular weight greater than 100, determined from atomic mass units, into the nozzle of the liquid-gas ejector as the motive liquid;

discharging the gas-vapor-liquid mixture from the liquid-gas ejector into a reservoir;

reducing flow velocity and boosting static pressure of the gas-vapor-liquid mixture in the reservoir whereby conditions are created for condensing of a condensable component of the gas-vapor-liquid mixture, for attaining of a phase equilibrium and for transforming the gas-vapor-liquid mixture into a gas-liquid mixture;

delivering the gas-liquid mixture from the reservoir into a separator; and separating the gas-liquid mixture into the motive liquid and a compressed gas.

2. In a system for the distillation of a liquid product, having a vacuum rectification column with a first pipeline for bleeding of a gas-vapor phase and a second pipeline for bleeding of at least one liquid fraction, and a vacuum-producing device including a liquid-gas ejector, a separator and a pump, the improvement comprising: a reservoir having a means for reducing flow velocity and for boosting static pressure of a gas-vapor-liquid mixture flowing into the reservoir; a gas inlet of the liquid-gas ejector connected to the first pipeline, a liquid inlet of the liquid-gas ejector connected to a discharge side of the pump, an outlet of the liquid-gas ejector connected to an inlet of the reservoir, an inlet of the separator connected to an outlet of the reservoir and a liquid outlet of the separator connected to a suction side of the pump.

3. The system according to claim 2, wherein the reservoir is further connected to the discharge side of the pump.

4. The system according to claim 2, wherein the reservoir is further connected to the second pipeline.

\* \* \* \* \*